(12) United States Patent
Mejuhas

(10) Patent No.: US 9,284,056 B2
(45) Date of Patent: Mar. 15, 2016

(54) SEAT FASTENING DEVICE

(75) Inventor: Marsel Mejuhas, Schwäebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 107 days.

(21) Appl. No.: 13/879,826

(22) PCT Filed: Oct. 20, 2011

(86) PCT No.: PCT/EP2011/005277
§ 371 (c)(1),
(2), (4) Date: Jun. 20, 2013

(87) PCT Pub. No.: WO2012/055508
PCT Pub. Date: May 3, 2012

(65) Prior Publication Data
US 2013/0256496 A1 Oct. 3, 2013

(30) Foreign Application Priority Data

Oct. 28, 2010 (DE) .......................... 10 2010 049 703
Apr. 30, 2011 (DE) .......................... 10 2011 100 107

(51) Int. Cl.
| | |
|---|---|
| *B60N 2/015* | (2006.01) |
| *B64D 11/06* | (2006.01) |
| *B60N 2/44* | (2006.01) |
| *B60B 7/08* | (2006.01) |
| *B64D 1/06* | (2006.01) |

(52) U.S. Cl.
CPC ............ *B64D 11/0696* (2013.01); *B60N 2/442* (2013.01); *B60B 7/08* (2013.01); *B60N 2/01575* (2013.01); *B64D 1/06* (2013.01)

(58) Field of Classification Search
CPC .. B60N 2/01575; B60N 2/0818; B60N 2/015; B60N 2/01508; B64D 11/0696; B64D 11/06; B60B 2/015; B60P 7/08
USPC ...................... 248/503, 503.1, 422, 423, 429; 244/122 R, 118.6, 131; 297/452.18, 297/378.12, 362.11, 362.14, 344.1, 216.8; 410/102, 104, 105

See application file for complete search history.

(56) References Cited

U.S. PATENT DOCUMENTS

| | | | |
|---|---|---|---|
| 4,449,875 A | 5/1984 | Brunelle | |
| 5,178,346 A * | 1/1993 | Beroth | ....... 244/122 R |
| 7,334,758 B2 * | 2/2008 | Williamson et al. | ....... 244/118.6 |
| 7,975,979 B2 * | 7/2011 | Bishop | ............ 248/429 |
| 2011/0309195 A1 * | 12/2011 | Bishop et al. | ............... 244/118.6 |

FOREIGN PATENT DOCUMENTS

| | | |
|---|---|---|
| DE | 295 25 000 U1 | 3/2004 |
| DE | 10 2007 014 420 A1 | 9/2008 |

OTHER PUBLICATIONS

International Search Report of the International Searching Authority mailed Apr. 11, 2012 for the corresponding international application No. PCT/EP2011/005277 (with English translation).

(Continued)

*Primary Examiner* — Tan Le
(74) *Attorney, Agent, or Firm* — POSZ Law Group, PLC

(57) ABSTRACT

A seat fastening device for fastening a seat or for lashing loads to a fastening rail fastened to a floor includes at least one movable fastening means, which is provided for coupling to the fastening rail, a force accumulation unit, an actuating unit and a gear unit. The gear unit is provided to prestress the force accumulator unit in an unlocking operation and to relieve the stress on the force accumulator unit in a locking operation.

16 Claims, 6 Drawing Sheets

(56) References Cited

OTHER PUBLICATIONS

Written Opinion of the International Searching Authority mailed Apr. 11, 2012 for the corresponding international application No. PCT/EP2011/005277 (with partial English translation).

International Preliminary Report on Patentability mailed May 10, 2013 in the corresponding international application No. PCT/EP2011/005277.

Office Action mailed Jun. 8, 2015 in the corresponding EP application No. 11 785 319.2-1754 (partial English translation attached).

* cited by examiner

SEAT FASTENING DEVICE

CROSS REFERENCE TO RELATED APPLICATIONS

This application is a U.S. national stage application of PCT/EP2011/005277 filed on Oct. 20, 2011, and claims priority to, and incorporates by reference, German patent applications No. 10 2010 049 703.7 filed on Oct. 28, 2010 and No. 10 2011 100 107.0 filed on Apr. 30, 2011.

TECHNICAL FIELD

1. Prior Art

The invention relates to a seat fastening device.

2. Background

There is already known a seat fastening device for fastening a seat or for securing loads to a fastening rail which is secured to a base, having at least one movable securing means, which is provided for coupling to the fastening rail, a force storage unit, an actuation unit and a gear unit.

In the known solutions, a seat or a load may be secured to a fastening rail by a force storage unit being pretensioned during a fastening operation. An unlocking operation is therefore supported by the force storage unit and, in the event of a defective locking element, leads to automatic and undesirable opening of the seat fastening device.

SUMMARY

An object of the invention is in particular to provide a seat fastening device of the generic type, by means of which particularly secure fastening of a seat to a fastening rail can be enabled.

This object is achieved with a seat fastening device according to patent claim 1. Other advantageous embodiments of the invention can be derived from the dependent claims.

The invention is based on a seat fastening device for fastening a seat or for securing loads to a fastening rail which is secured to a base, having at least one movable securing means which is provided for coupling to the fastening rail, a force storage unit, an actuation unit and a gear unit.

It is proposed that the gear unit be provided to pretension the force storage unit during an unlocking operation and to relax the force storage unit during a locking operation. The term a "gear unit" is intended to be understood in particular to be a unit for transmitting a force and/or converting a movement, in particular a rotational movement, into a linear movement. The term a "force storage unit" is intended in this context to be understood in particular to be a unit which is provided to store energy in the form of a clamping force and in particular to counteract a force which is applied mechanically. As a result of such a configuration, an unintentional or malicious unlocking of the seat fastening device by hand can advantageously be prevented and the safety can be increased for a user. Furthermore, a force required to lock the seat fastening device can advantageously be reduced and use of a locking tool can be prevented.

In addition, it is proposed that, between the gear unit and the force storage unit, a support means for direct force transmission between the gear unit and the force storage unit be arranged. The term "direct force transmission" is intended in this context in particular to be understood to mean that a force path from the gear unit via the support means, which may also be constructed in several parts, is introduced directly into the force storage unit and that an introduction of the force path from the gear unit into the force storage unit is carried out in particular with force loading of the movable securing means being prevented. A uniform force distribution can thereby advantageously result in reduced wear of components, and requirements with respect to a hardness of surfaces of the components can thereby be reduced.

If the force storage unit comprises at least one surface which is directed towards the gear unit and which forms the support means for direct force transmission between the gear unit and the force storage unit, a particularly simple and component-saving solution can be provided.

If the support means and the securing means each have at least one carrier element and the carrier elements act together to carry the securing means during a locking operation, a particularly simple and uniform force transmission from the gear unit to the force storage unit can be achieved.

If, after an unlocking operation, the carrier element of the securing means rests on the carrier element of the support means, without any loading as a result of forces other than gravitational force, so that the carrier element of the support means forms a retention member for the securing means, non-releasability of the securing means can be ensured in a structurally simple manner.

In another embodiment, it is proposed that the gear unit be provided to convert a rotation of the actuation unit into a movement of the movable securing means. Particularly simple coupling of the securing means can thereby be achieved with the fastening rail.

It is further proposed that the seat fastening device have a tool engagement member which is provided to receive an unlocking tool in order to carry out the unlocking operation, whereby uncoupling of the securing means from the fastening rail can advantageously be carried out by means of an auxiliary tool. The term "tool engagement member" is intended in this context to be understood to refer in particular to a recess, preferably an internal hexagon, and/or a continuation, whereby a corresponding unlocking tool can be coupled.

In an advantageous embodiment, the seat fastening device may have at least two fixedly arranged securing means, which are arranged one behind the other in one direction starting from the movable securing means so that the actuation unit can be constructed in a particularly compact manner, with at the same time a high level of ergonomics.

It is further proposed that the actuation unit have a pivotably supported actuation lever, whereby a particularly simple structure of the seat fastening device can be achieved.

In a particularly preferred manner, the tool engagement member is arranged with spacing from a pivot axis of the actuation unit, whereby a particularly simple handling of the actuation unit can be achieved.

If the unlocking operation is carried out by rotation of the actuation lever through 180° or less, unlocking of the seat fastening device can be carried out in a particularly comfortable manner. The unlocking operation is preferably carried out by rotating the actuation lever through less than 100°.

If the gear unit has a cam mechanism, by the actuation unit being moved with a few movable components, a movement of the at least one securing means can be achieved.

If, in at least one operating state, the cam mechanism is operationally connected to a seat frame to be fastened, additional components in the seat fastening device can advantageously be saved.

It is further proposed that the force storage unit have a spring set, whereby a force can be absorbed and discharged in a particularly simple manner.

If the spring set is arranged coaxially relative to a movement direction of the securing means, a particularly compact structure of the seat fastening device can be achieved.

It is further proposed that the actuation lever be recessed in a closed state in a base member. A malicious unlocking operation by hand can thereby advantageously be prevented.

BRIEF DESCRIPTION OF THE DRAWINGS

Other advantages will be appreciated from the following description of the drawings. In the drawings, two embodiments of the invention are illustrated. The description and the claims contain numerous features in combination. The person skilled in the art will also advantageously consider the features individually and combine them to form other advantageous combinations.

DETAILED DESCRIPTION

Figure 1:
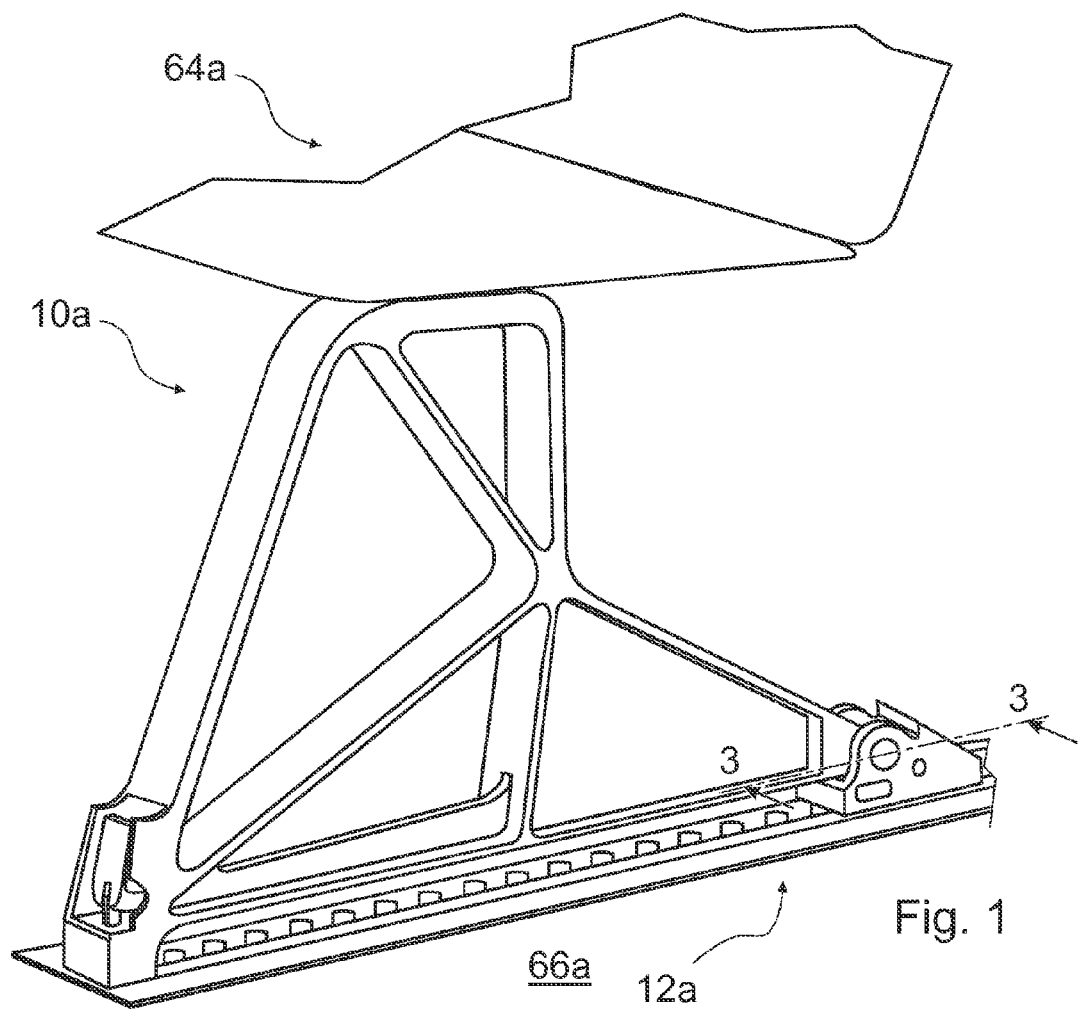
FIG. 1 is a perspective, schematic view of a seat frame of an aircraft passenger seat having two seat fastening devices.

FIG. 1 is a schematic, perspective view of a seat frame $10a$ of a seat $64a$ which is constructed as an aircraft passenger seat. The seat frame $10a$ is coupled to a fastening rail $12a$ by means of two seat fastening devices. The fastening rail $12a$ is secured to a base $66a$ of an aircraft cabin. When the seat fastening devices are in an open state, the seat frame $10a$ can be displaced along the fastening rail $12a$.

Figure 2:
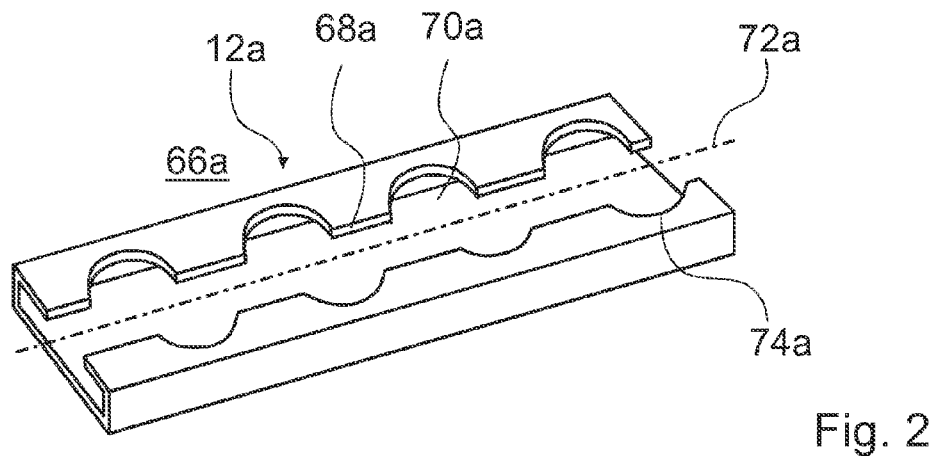
FIG. 2 is a perspective view of a fastening rail.

The fastening rail $12a$ is illustrated in greater detail in a detailed view in FIG. 2. The fastening rail $12a$ terminates flush at the upper side thereof with the base $66a$. The fastening rail $12a$ is formed by a hollow profile-member which delimits a longitudinal channel $70a$ at the upper side thereof with mutually facing profile flanks $68a$. The longitudinal channel $70a$, which extends in a longitudinal direction $72a$ which preferably corresponds to a flight direction, has through-openings $74a$ which expand the free inlet cross-section thereof to a predetermined extent and which have a uniform spacing from each other and which are constructed in a bore-like manner. This embodiment of a fastening rail $12a$ is known in the prior art and is not described here in greater detail.

Figure 3:
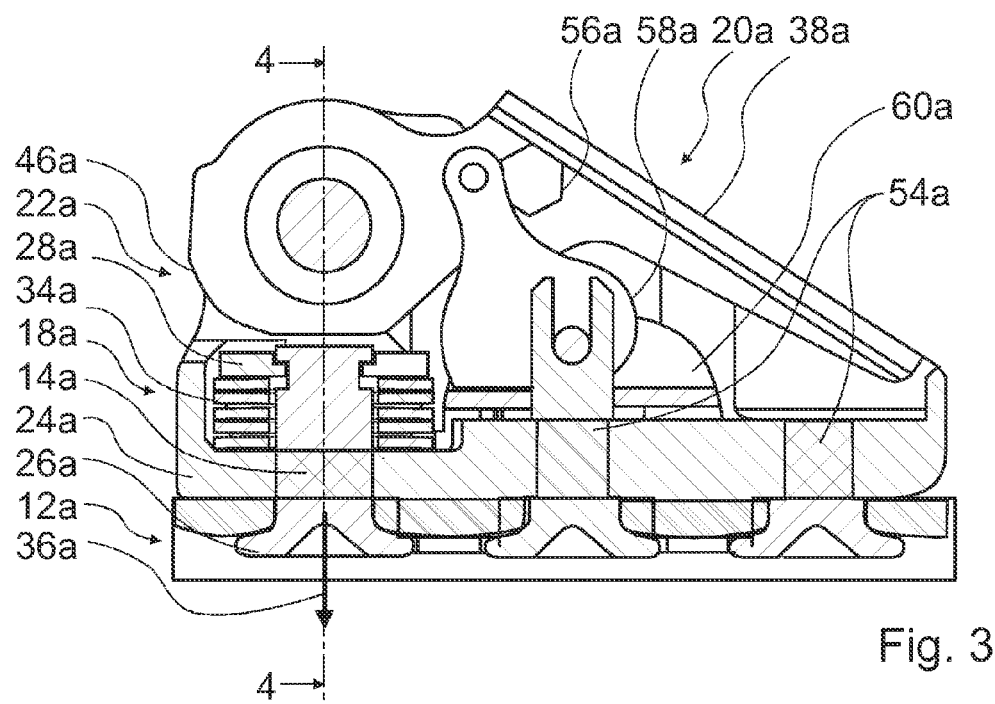
FIG. 3 is a sectional view taken along line 3-3 of FIG. 1 through a seat fastening device in a locked state.

A seat fastening device is illustrated in a closed state in FIG. 3 as a sectioned view. The seat fastening device has a movable securing means $14a$, a force storage unit $18a$, an actuation unit $20a$ and a gear unit $22a$.

The securing means $14a$ is arranged in a base member $24a$ of the seat fastening device so as to be linearly movable in a movement direction $36a$. At one end of the securing means $14a$, there is arranged a securing foot $26a$ which is provided for coupling to the fastening rail $12a$. At an end opposite the securing foot $26a$, the securing means $14a$ has a carrier element $16a$ which is formed by a lateral face of a recess and is coupled to a support means $28a$ which is formed by a support ring. The support ring also has a carrier element $32a$ which is formed integrally on the support ring and which forms an upwardly open shoulder. The support means $28a$ is arranged between the gear unit $22a$ and the force storage unit $18a$ in order to form a direct force transmission between the gear unit $22a$ and the force storage means $18a$, as will be described below. To this end, the support ring partially surrounds the securing means $14a$ and provides a support face $30a$ for the force storage unit $18a$. The support face $30a$ and a lower side of the carrier element $32a$ of the support ring are in alignment.

The base member $24a$ further has two fixedly arranged securing means $54a$ which are arranged one behind the other in one direction starting from the movable securing means $14a$. The movable securing means $14a$ is consequently secured to a lateral end of the base member $24a$.

The force storage unit $18a$ has a spring set $34a$ which abuts the base member $24a$ and the support ring. A force applied to the support ring is absorbed by the spring set $34a$. The spring set $34a$ is formed by disk springs which are arranged coaxially relative to the movement direction $36a$ of the securing means $14a$.

Figure 3A:
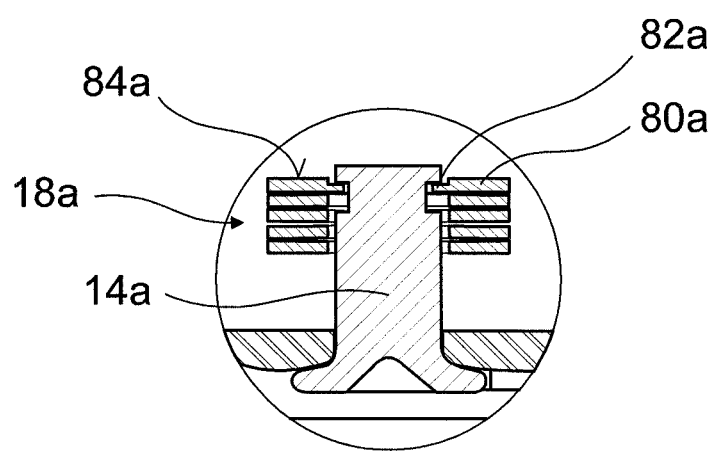
FIG. 3A is a cut-out of the seat fastening device according to FIG. 3, with an alternative embodiment of a force storage unit with integrated support means.

In principle, an alternative embodiment of the force storage unit $18a$ is also conceivable in which, as illustrated in FIG. 3A, a disk spring $80a$ which is arranged closest to the gear unit $22a$ is provided with a carrier element $82a$ and in which a surface of the disk spring $80a$ facing the gear unit $22a$ forms a support means $84a$ for direct force transmission between the gear unit $22a$ and the force storage unit $18a$.

Figure 4:
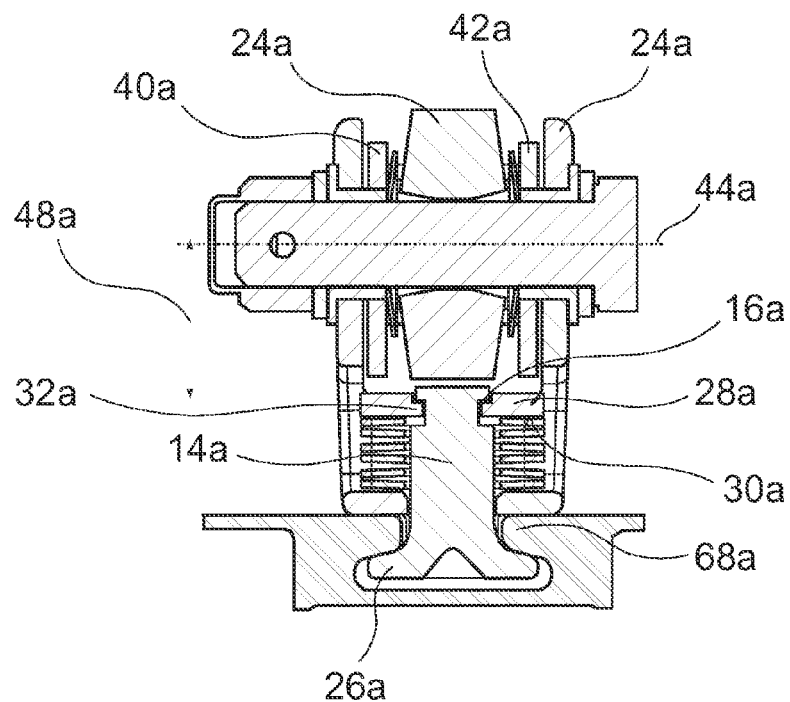
FIG. 4 is a sectional view taken along line 4-4 of FIG. 3 showing the seat fastening device in the locked state.

The actuation unit $20a$ is arranged on the base member $24a$ and has an actuation lever $38a$ which is located in an initial position illustrated in FIG. 3. The actuation lever $38a$ is constructed at one end as a rigid fork with two arms $40a$, $42a$ (FIG. 4) and is supported at center points of the arms $40a$, $42a$ pivotably about a pivot axis $44a$ which is arranged in the base member $24a$ perpendicularly relative to the plane of section of FIG. 3. The actuation lever $38a$ extends over a large portion of the base member $24a$ above the fastening rail $12a$. In the closed state shown in FIG. 3, the actuation lever $38a$ is recessed in the base member $24a$.

On the actuation unit $20a$, there is arranged the gear unit $22a$ which has a cam mechanism $46a$. The cam mechanism $46a$ comprises two cam disks, which are each integrally formed with one of the arms $40a$, $42a$ of the rigid fork of the actuation lever $38a$. However, embodiments which are constructed separately and which appear advantageous to the person skilled in the art are also conceivable.

In order to further secure the base member $24a$ against displacement along the fastening rail $12a$, the seat fastening device has a second cam mechanism $58a$ which moves a longitudinal securing means $60a$ in recesses of the fastening rail $12a$.

Figure 6:
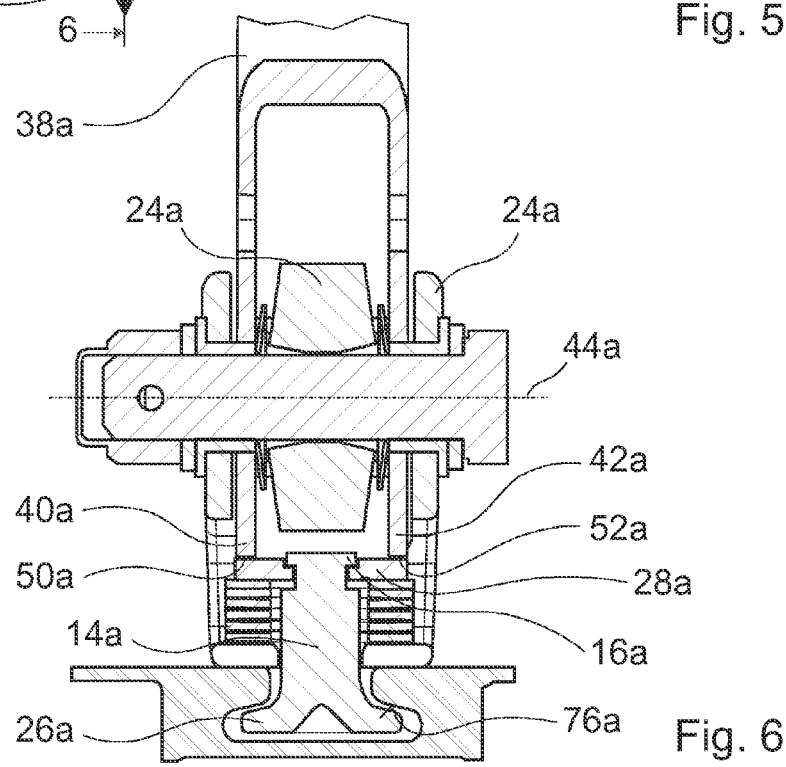
FIG. 6 is a sectional view taken along line 6-6 of FIG. 5 showing the seat fastening device in the unlocked state.

When the actuation lever $38a$ is rotated, the cam mechanism $46a$, without touching the securing means $14a$, moves laterally past the securing means $14a$ into contact with the support means $28a$ formed by the support ring (FIG. 6). The rotation of the actuation lever $38a$ is converted into a linear movement of the movable support ring, the securing means $14a$ remaining unloaded in terms of force as a result of the cam mechanism $46a$.

During an unlocking operation, the actuation lever $38a$ is rotated through approximately 95°. The gear unit $22a$ thereby presses, with the cam mechanism $46a$ thereof at two support locations $50a$, $52a$ which face each other in a perpendicular direction relative to the movement direction 36a, against the support ring which is moved in a movement direction 36a towards the fastening rail 12a. The spring set 34a is subject to a compression between the base member 24a and the support ring and is consequently pretensioned.

In order to unlock the seat fastening device counter to a resilient force of the spring set 34a, the actuation lever 38a has a tool engagement member 56a. Owing to the use of an unlocking tool (not illustrated) which engages in the tool engagement member 56a, the seat fastening device can be unlocked. The tool engagement member 56a is arranged with spacing from the pivot axis 44a of the actuation lever 38a of the actuation unit 20a, whereby the actuation unit 20a can be handled in a particularly simple manner. In order to carry out the unlocking operation with an unlocking tool, other embodiments which appear advantageous to the person skilled in the art are also conceivable, such as in particular a screwdriver engagement member in the base member 24a.

Figure 5:
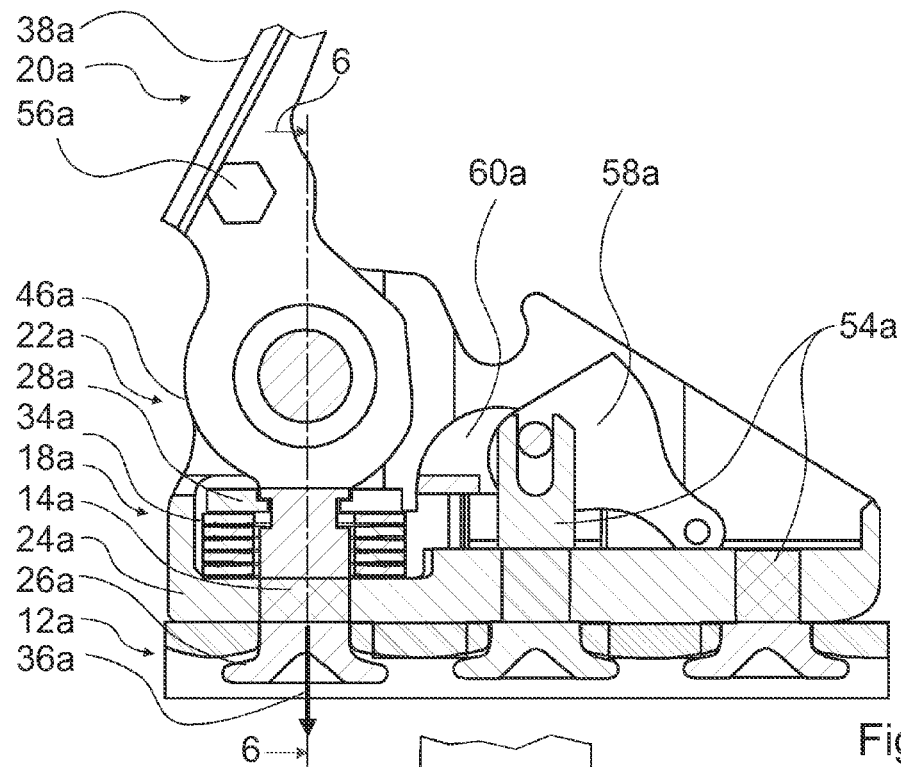
FIG. 5 is a section through the seat fastening device according to FIG. 3 in an unlocked state.

In FIG. 5, the seat fastening device is illustrated in an unlocked state. At the end of the unlocking operation, the carrier element 16a of the securing means 14a, without any loading from forces other than gravitational force, rests on the carrier element 32a of the support means 28a, which thereby forms a retention member for the securing means 14a which prevents a loss of the securing means 14a. The movable securing means 14a is released from the fastening rail 12a, can be moved freely within limits which are determined by the coupling with respect to the support means 28a and enables a displacement of the seat fastening device along the fastening rail 12a, when in addition the longitudinal securing means 60a is raised by the second cam mechanism 58a.

A locking operation is initiated by means of an actuation of the actuation lever 38a back into the initial position. The actuation lever 38a pivots through approximately 95°. The resilient force of the spring set 34a supports the locking operation. An unlocking tool can therefore be avoided for the locking operation. By means of a rotation of the actuation lever 38a back into the initial position, the cam mechanism 46a of the gear unit 22a shortens a spacing 48a of the support means 28a formed by the support ring with respect to the pivot axis 44a, allows a movement of the support ring counter to the movement direction 36a and thereby partially relaxes the spring set 34a of the force storage unit 18a. In the initial position, the cam mechanism 46a is lifted from the support means 28a. After the partial relaxation of the spring set 34a, the securing foot 26a of the securing means 14a is pressed against a lower side 76a of the profile flanks 68a of the fastening rail 12a (FIG. 4) by a remaining resilient force of the spring set 34a resulting from joint action of the carrier element 16a of the securing means 14a and the carrier element 32a of the support means 28a, by means of which the securing means 14a is carried by the relaxation movement of the spring set 34a.

Another embodiment of the invention is shown in FIGS. 7 to 10. The following descriptions are limited substantially to the differences between the embodiments, reference being able to be made to the description of the other embodiment, in particular of FIGS. 3 to 6, with regard to components, features and functions which remain the same. In order to differentiate between the embodiments, the letter a in the reference numerals of the embodiment in FIGS. 3 to 6 is replaced by the letter b in the reference numerals of the embodiment of FIGS. 7 to 10. With regard to components which have the same designation, in particular with regard to components with the same reference numerals, it is also possible in principle to refer to the drawings and/or the description of the other embodiment, in particular of FIGS. 3 to 6.

Figure 7:
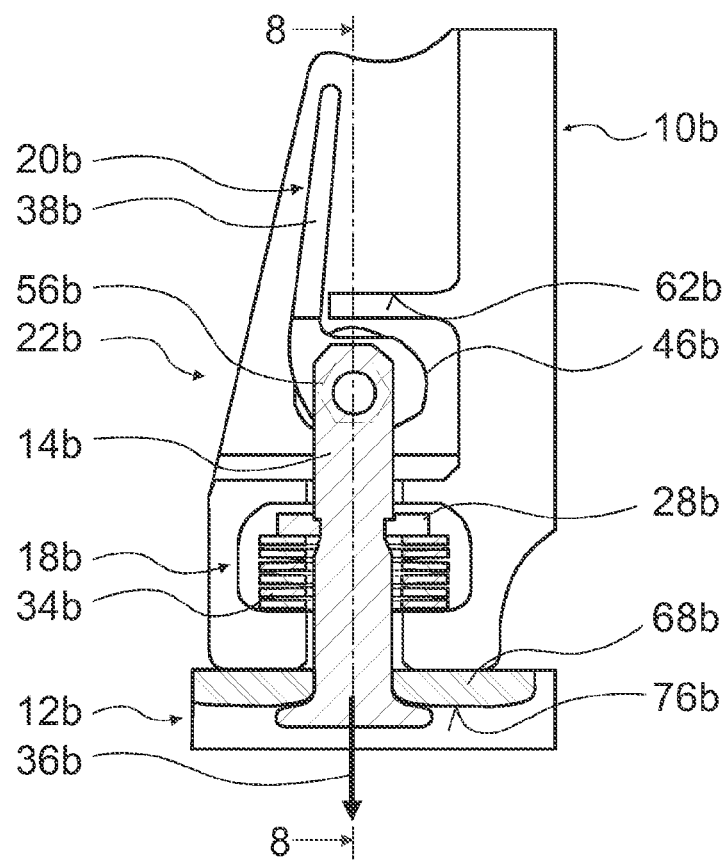
FIG. 7 is a section through another embodiment of a seat fastening device in a locked state.
Figure 8:
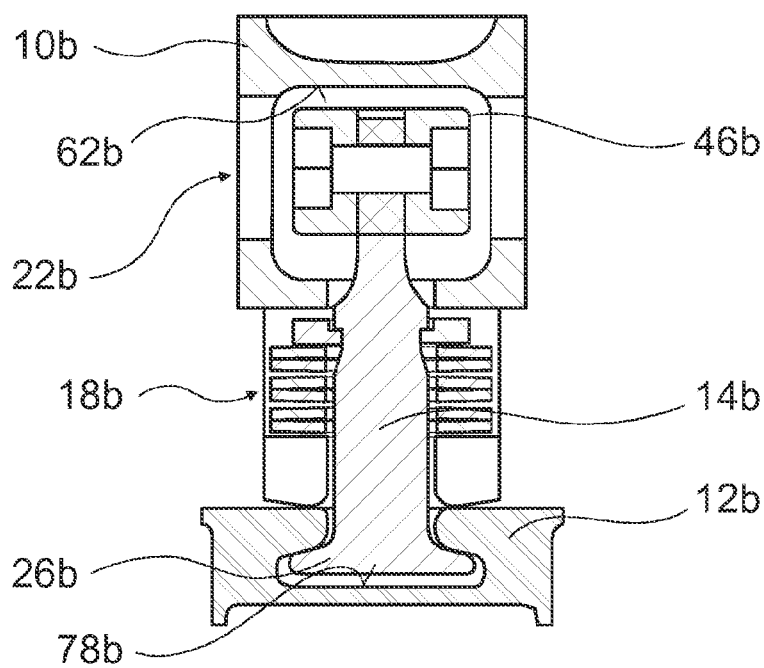
FIG. 8 is a sectional view taken along line 8-8 of FIG. 7 showing the seat fastening device in the locked state.

FIG. 7 and FIG. 8 show a seat fastening device on a fastening rail 12b having a gear unit 22b and an actuation unit 20b which has an actuation lever 38b in a locked state. The actuation lever 38b is pivotably supported on a linearly movable securing means 14b. A force storage unit 18b, which is constructed as a spring set 34b, applies a resilient force counter to a movement direction 36b. The actuation lever 38b is constructed integrally with a cam mechanism 46b of the gear unit 22b.

In order to unlock the seat fastening device counter to a resilient force of the spring set 34b, the actuation lever 38b has a tool engagement member 56b. By an unlocking tool (not illustrated) which engages in the tool engagement member 56b being used, the seat fastening device can be unlocked.

In the event of a rotation of the actuation lever 38b, the cam mechanism 46b moves into operational connection with a support face 62b of a seat frame 10b which is to be secured. The spring set 34b is pressed together in the movement direction 36b, the securing means 14b is released at a lower end which is constructed as a securing foot 26b from a lower side 76b of the profile flanks 68b of the fastening rail 12b and moves relative to the seat frame 10b in the movement direction 36b towards an inner side of a base 78b of a hollow profile-member which forms the fastening rail 12b.

Figure 9:
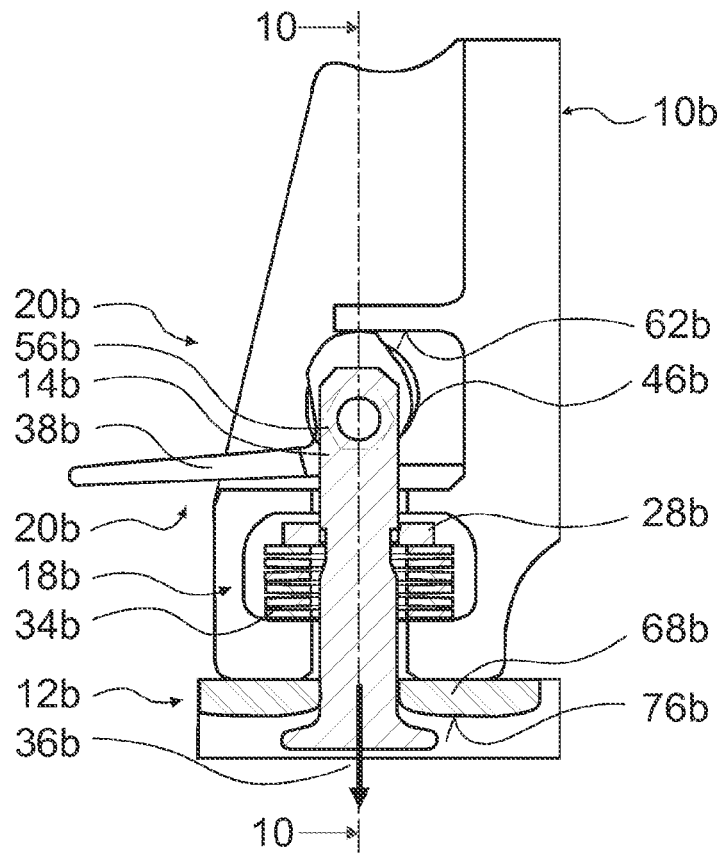
FIG. 9 is a section through the seat fastening device according to FIG. 7 in an unlocked state.
Figure 10:
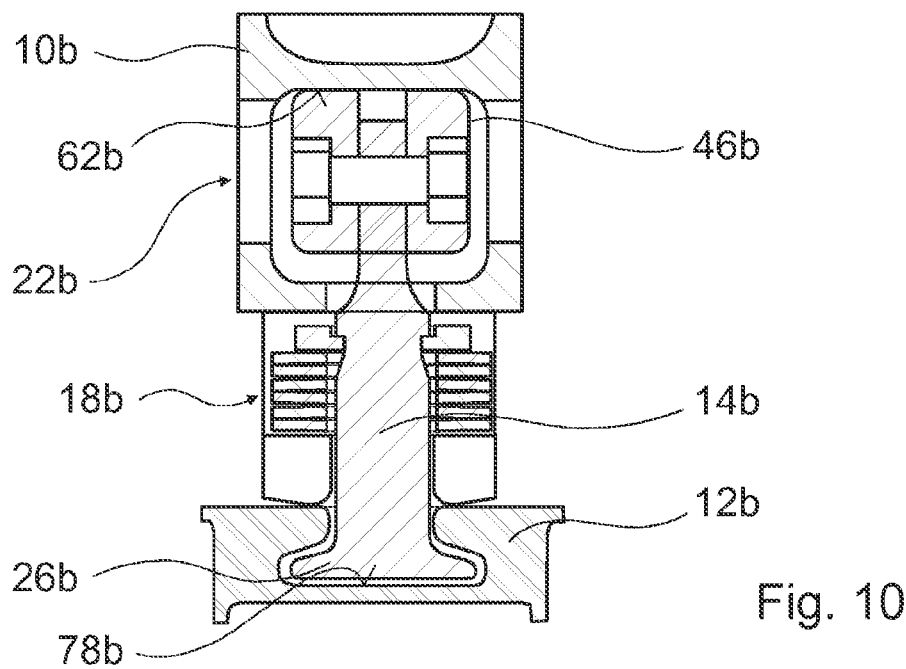
FIG. 10 is a sectional view taken along line 10-10 of FIG. 9 showing the seat fastening device in the unlocked state.

FIG. 9 and FIG. 10 show the seat fastening device in an unlocked state. The securing means 14b is released from the lower side 76b of the profile flanks 68b of the fastening rail 12b and enables a movement of the seat fastening device along the fastening rail 12b.

The invention claimed is:

1. A seat fastening device for fastening a seat or for securing loads to a fastening rail which is secured to a base, having at least one movable securing means which is provided for coupling to the fastening rail, a force storage unit, an actuation unit and a gear unit, wherein
    the gear unit is provided to pretension the force storage unit during an unlocking operation and to relax the force storage unit during a locking operation,
    between the gear unit and the force storage unit, a support means for direct force transmission between the gear unit and the force storage unit is arranged,
    the force storage unit comprises at least one surface which is directed towards the gear unit and which forms the support means, and
    after an unlocking operation, at least one carrier element of the securing means, without any loading as a result of forces other than gravitational force, rests on at least one carrier element of the support means which thereby forms a retention member for the securing means.

2. The seat fastening device as claimed in claim 1, wherein the support means and the securing means each have at least one carrier element and the carrier elements act together to carry the securing means during a locking operation.

3. The seat fastening device as claimed in claim 1, wherein the gear unit is provided to convert a rotation of the actuation unit into a movement of the movable securing means.

4. The seat fastening device as claimed in claim 1, further comprising a tool engagement member which is provided to receive an unlocking tool in order to carry out the unlocking operation.

5. The seat fastening device as claimed in claim 1, wherein the actuation unit has a pivotably supported actuation lever.

6. The seat fastening device as claimed in claim 4, wherein the tool engagement member is arranged with spacing from a pivot axis of the actuation unit.

7. The seat fastening device as claimed in claim 1, wherein the actuating unit has an actuating lever and the unlocking operation is carried out by rotation of the actuation lever through 180° or less.

8. The seat fastening device as claimed in claim 1, wherein the gear unit has a cam mechanism.

9. The seat fastening device as claimed in claim 8, wherein the cam mechanism is operationally connected to a seat frame to be fastened in at least one operating state.

10. The seat fastening device as claimed in claim 1, wherein the force storage unit has a spring set.

11. The seat fastening device as claimed in claim 10, wherein the spring set is arranged coaxially relative to the movement direction of the securing means.

12. The seat fastening device as claimed in claim 7, wherein the actuation lever is recessed in a closed state in a base member.

13. A seat, in particular an aircraft passenger seat, having a seat fastening device as claimed in claim 1.

14. A seat fastening device for fastening a seat or for securing loads to a fastening rail which is secured to a base, having at least one movable securing means which is provided for coupling to the fastening rail, a force storage unit, an actuation unit and a gear unit, wherein the gear unit is provided to pretension the force storage unit during an unlocking operation and to relax the force storage unit during a locking operation, between the gear unit and the force storage unit, a support means for direct force transmission between the gear unit and the force storage unit is arranged, and the support means and the securing means each have at least one carrier element and the carrier elements act together to carry the securing means during a locking operation.

15. The seat fastening device as claimed in claim 14, further comprising a tool engagement member which is provided to receive an unlocking tool in order to carry out the unlocking operation.

16. The seat fastening device as claimed in claim 14, wherein the actuation unit has a pivotably supported actuation lever.

\* \* \* \* \*